N. S. SNEDEKER.
Furnace for Puddling Iron.
No. 49,565.
Patented Aug. 22, 1865.
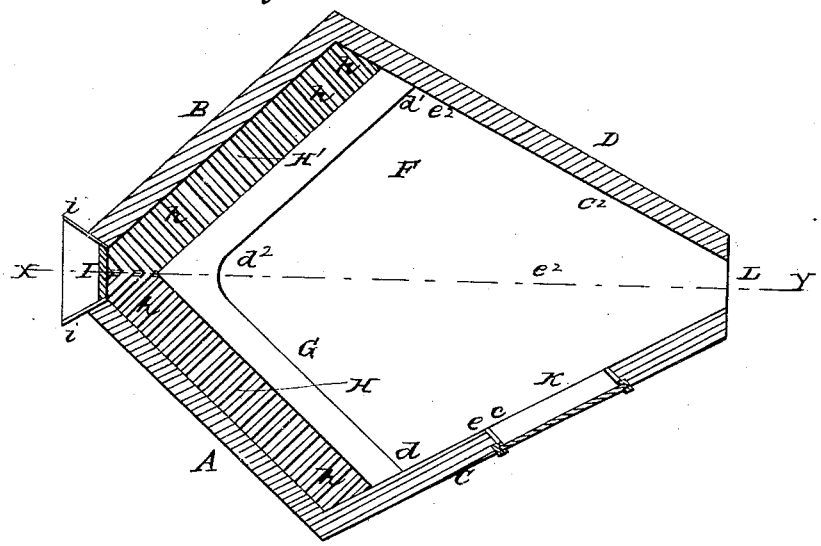
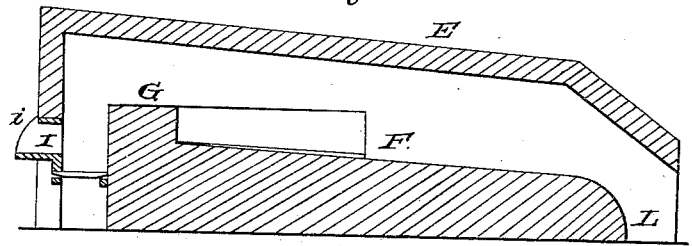
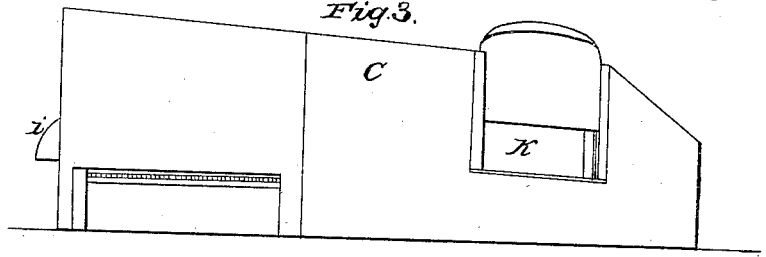

UNITED STATES PATENT OFFICE.

NELSON S. SNEDEKER, OF PHILADELPHIA, PENNSYLVANIA.

IMPROVED FURNACE FOR PUDDLING IRON.

Specification forming part of Letters Patent No. 49,565, dated August 22, 1865.

*To all whom it may concern:*

Be it known that I, NELSON S. SNEDEKER, of the city of Philadelphia, in the State of Pennsylvania, have invented certain new and useful Improvements in Furnaces for Heating or Puddling Iron; and I do hereby declare that the following is a full, clear, and exact description of the same, reference being had to the annexed drawings, forming a part hereof, in which—

Figure 1 is a plan. Fig. 2 is a section on the line $x\ y$ in Fig. 1; Fig. 3, a side view of my improved furnace for heating iron preparatory to the rolling thereof.

In order that my improvements may be more readily understood, I will first point out the evils which they are intended to remedy.

First. Hitherto furnaces for heating and furnaces for puddling iron have been built with square fronts, the fire-chamber extending at and parallel with the front across from one side to the other side of the furnace. Owing to this arrangement of the fire-chamber a pile or billet of iron, when placed in the furnace to be heated, is more exposed on one side than on the other side to the direct action of the flame, the side most exposed to the flame being burned and wasted before the opposite side is heated to a welding-heat. I construct my heating-furnace with an angular front, with angular sides, an angular bridge-wall, and an angular charging bottom or floor, and I arrange the fire-chamber on two sides of the charging-bottom, all as shown in the annexed drawings, so that each pile or billet of iron when placed in the furnace has all of its sides exposed to a uniform heat at the same time.

Second. In furnaces as hitherto constructed, with square fronts and nearly parallel sides, the bridge or wall which separates the fire-chamber from the charging-bottom is placed a little—say about twenty inches—above the charging-doorway—that is, toward the front of the furnace—so that when the furnace is fully charged almost one-half of all the piles or billets forming the charge extend below the charging-doorway—that is, toward the flue. Whenever the charging-door is opened for the purpose of handling and drawing out the iron a current of cold air rushes into the furnace, and, being influenced by the draft inside the furnace, passes toward and out through the flue, so that when the piles or billets are arranged on the bottom below the charging-doorway, as last above mentioned, this current of cold air comes directly in contact with them, causing great waste and damaging the iron in a way that furnace-men and iron manufacturers readily understand. In furnaces of the old construction, whenever the furnace-men are using bad fuel or whenever from any cause the furnace has a bad draft those piles or billets which are placed below the charging-doorway, owing to their distance from the fire-chamber and to their being cooled by the currents of air through the charging-doorway, as above mentioned, cannot always be brought to a soft welding-heat. In such cases the iron has to be drawn from that part of the furnace and placed near the fire-chamber before it can be sufficiently heated to be rolled or hammered. This causes extra labor, and loss of time and fuel. These great evils I overcome by placing the charging-doorway in the angular side of the furnace and by constructing the front and sides of the furnace, the fire-chamber, the bridge, and the bottom in the angular form shown in the drawings. I thus can heat, charge, and handle all the iron above the doorway and near the fire-chamber, and out of the line of the draft before mentioned.

Third. Owing to the width and depth of the fire-chamber in furnaces as hitherto built, the stock-hole or firing-door is placed on one side of the furnace, near the front. During the operation of heating or puddling furnaces the stock-hole is kept closed with fresh fuel, which, on the fire side, gets heated and partly coked or ignited before it is actually pushed into the fire-chamber. As additional fuel is necessary this partly-ignited fuel is fed into the fire-chamber by means of a hoe or similar implement. The stock-hole is then again closed with fresh fuel. Thus the back end of the fire-chamber is kept supplied with partly-ignited fuel while the front end is supplied with fresh fuel, and the fire at the back end of the fire-chamber is caused to burn with more intensity. Thus piles on the two sides of the furnace are exposed to different degrees of heat. In puddling-furnaces this want of uniformity in the heating of the furnace causes a great deal of iron to be badly made, the pig-iron being melted on one side of the furnace before it is melted on the other side of the furnace, so that the raw and ready iron sometimes get mixed.

I obviate these evils by the angular shape of the furnace, arranging the fire-chamber in two branches, placing the stock-hole in the middle of the front of the furnace, and so as to command both branches of the fire-chamber, as shown in the drawings.

To enable others skilled in the art to make and use my improvements, I will proceed to describe their construction and mode of operation.

In the drawings, A B C D, Fig. 1, represent the outside walls of the furnace, which is built of fine brick, is bound with iron plates, and has an arched reverberatory roof, E, Fig. 2, also of fire-brick, in the same manner as in ordinary heating and puddling furnaces. The plan of my furnace is of an angular form, as shown in Fig. 1, the front, which consists of the two sides A B, tapering toward the stock-hole and the rear sides, C D, tapering toward the flue.

F is the bottom of the furnace, made of sand in the ordinary way, and separated by a bridge, G, of fire-brick from the fire-chamber H H', which is in two branches extending along both fronts of the bottom, and provided with movable grate-bars $h$. The bottom is inclined toward the flue, as shown.

I is the stock-hole or firing-doorway, which is provided with a frame, $i$, having flaring sides. This frame is kept filled with coal while the furnace is in operation.

K is the door through which the piles or billets are charged, handled, and drawn out.

At L the furnace connects with the flue in the ordinary way.

In furnaces intended for heating, say, thirty hundred-weight of iron at a single heat I make the width of the fire-chamber H H' from the bridge G to the front wall, A B, sixteen inches. Each branch of the fire-chamber H H' is about six feet long. The bridge G extends about eight inches above the level of the bottom F, and is about thirteen inches thick. The charging-doorway K is about three feet wide, and is placed in the side C, about two feet from the end of the bridge, as shown. The sides of this doorway are beveled so as to correspond with the angle of the near side of the bridge, as shown in Fig. 1. This doorway, being so located and constructed, facilitates the operations of charging, handling, and drawing out the piles. The stock-hole I is about sixteen inches wide and about nine inches high, and is placed so that the bottom of it is in line with the bottom of the charging-door. The furnace is about sixteen feet long on a middle straight line from the stock-hole I to the point L. The bottom F is about eight feet wide between the points marked $d\ d'$, Fig. 1, and about seven feet from the jamb $c$ of the charging-door to the point $d^2$ of the bridge. The walls C D and the roof of the furnace are contracted at the rear, as shown, so that the furnace-chamber at the point L, where it connects with the flue, is about eighteen inches in width.

The piles or billets are charged through the doorway K toward the bridge G, and, if desired, the whole of the bottom between the bridge and a line extending from the point $c$ to the point $c^2$, Fig. 1, may be covered with piles or or billets. When the door at K is open cold air rushes into the furnace, but owing to the peculiar form which I give to the bottom, and which enables me to arrange the piles above the doorway K, as described, this air does not come in contact with the iron, but is drawn by the current of heated air out through the rear end, L, of the furnace-chamber into the flue.

In furnaces of large dimensions—as, for instance, where it is intended to heat three tons of iron at a single heat—it is preferable to have two charging-doors, one in each of the sides C D, each door being constructed and arranged relatively in the same manner as described for the door K.

The furnace which I have described may be employed with great advantage as a puddling-furnace, the only alterations necessary to adapt it to such use being to close the charging-door way or ways, extend an angular bridge similar to bridge G from the point $e$ to the point $e'$, and thence to the point $e^2$, substituting a puddling-furnace bottom for the sand bottom of the heating-furnace, and opening two doorways—one in the side C and the other in the side D of the furnace—between the points where the ends of the bridges join the side walls of the furnace.

Having thus described my invention, what I claim, and desire to secure by Letters Patent, is—

1. Arranging the fire-chamber in heating or puddling furnaces on two sides of the bottom, so that the flame from the fire is caused to act simultaneously on more than one side of the iron which is to be heated or puddled, substantially as shown and described.

2. Giving the front end of the bottom F an angular form, so that the iron to be heated or puddled when placed thereon is caused to present more than one side to the direct action of the flame, substantially as shown and described.

3. The arrangement of the stock-hole I, in combination with the fire-chamber H H', the angular bottom F, the angular bridge G, the charging door or doors K, and the tapering sides C D, in the manner and for the purpose substantially as shown and described.

4. The combination of the charging-door K with the angular bottom F, these parts being constructed and arranged and operating substantially as shown and described.

NELSON S. SNEDEKER.

Witnesses:
J. E. SHAW,
GEORGE BUCKLEY.